April 14, 1970     J. G. KEITH     3,506,407
SIMPLIFIED CONTINUOUS RENDERING SYSTEM
Filed Oct. 12, 1966     4 Sheets-Sheet 1

INVENTOR
JACK G. KEITH,
BY Yungblut, Melville, Strasser and Foster
ATTORNEYS

April 14, 1970   J. G. KEITH   3,506,407
SIMPLIFIED CONTINUOUS RENDERING SYSTEM
Filed Oct. 12, 1966   4 Sheets-Sheet 2

INVENTOR
JACK G. KEITH,
BY Yungblut, Melville, Strasser and Foster
ATTORNEYS

April 14, 1970  J. G. KEITH  3,506,407
SIMPLIFIED CONTINUOUS RENDERING SYSTEM
Filed Oct. 12, 1966  4 Sheets-Sheet 3
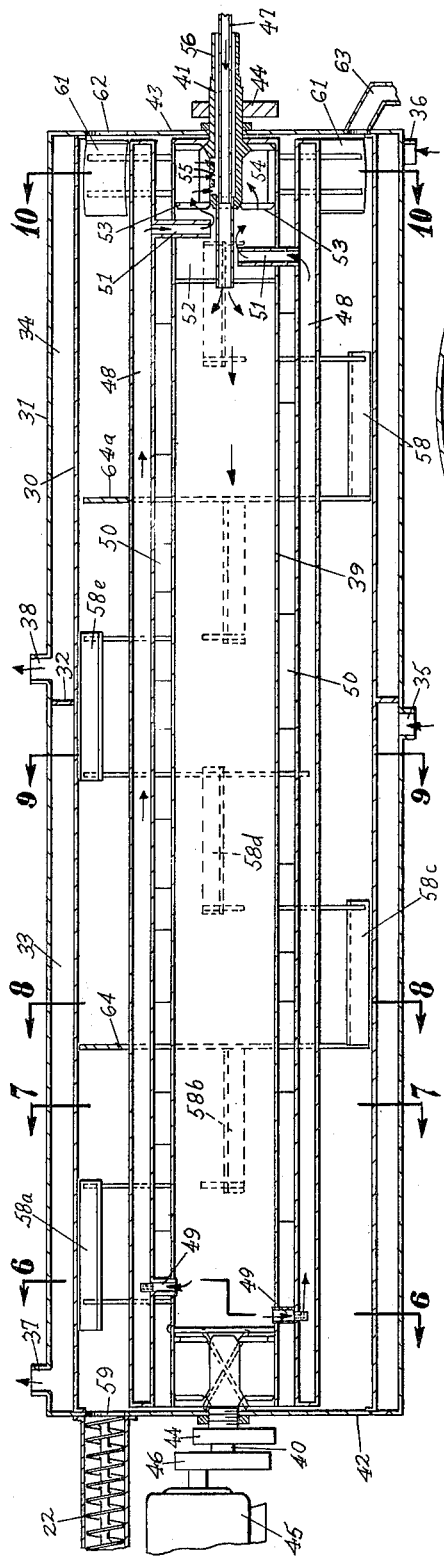
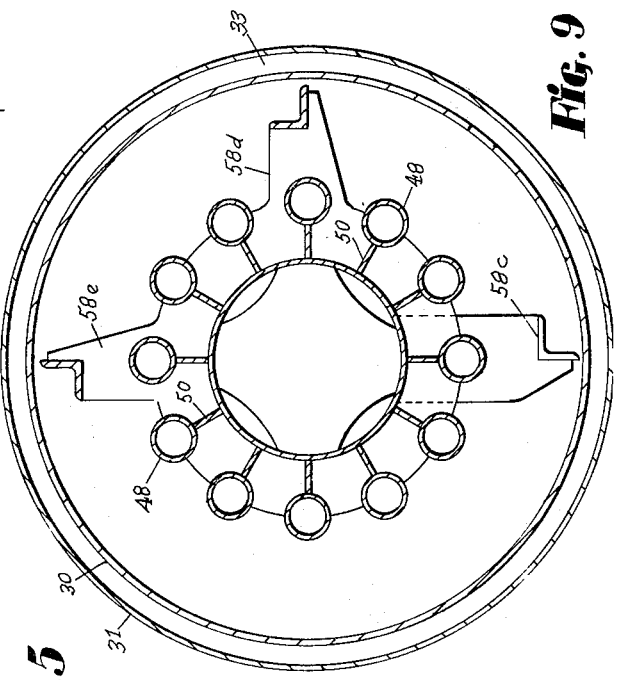
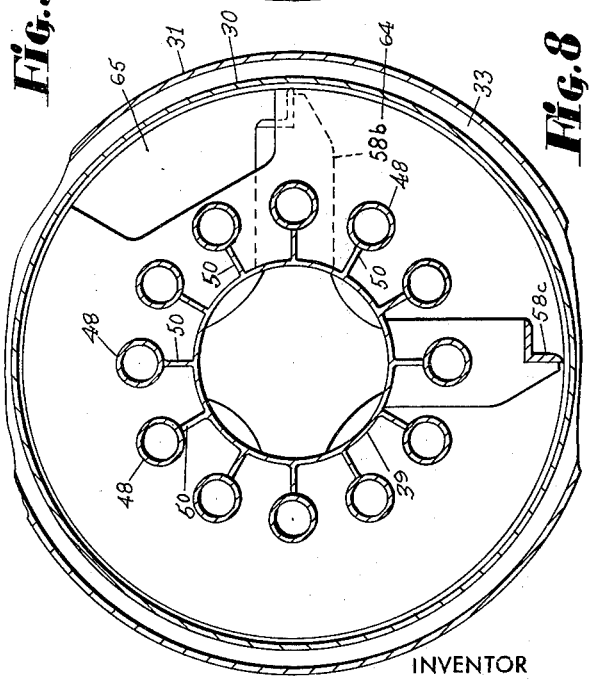
INVENTOR
JACK G. KEITH,
BY Yungblut, Melville, Strasser and Foster
ATTORNEYS April 14, 1970  J. G. KEITH  3,506,407
SIMPLIFIED CONTINUOUS RENDERING SYSTEM
Filed Oct. 12, 1966  4 Sheets-Sheet 4
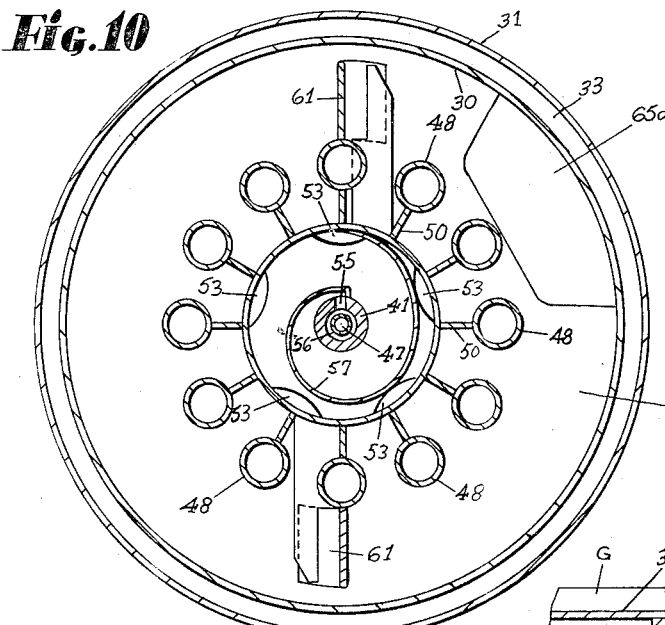
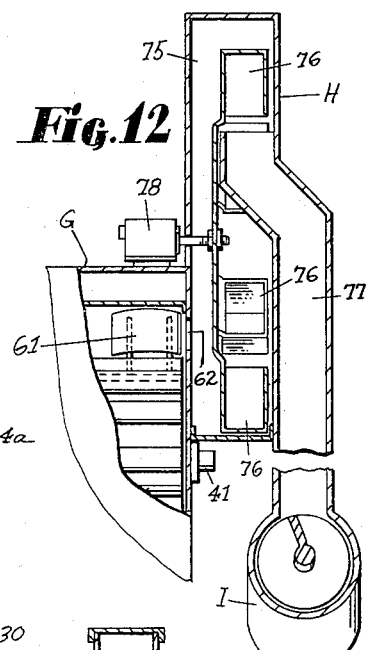
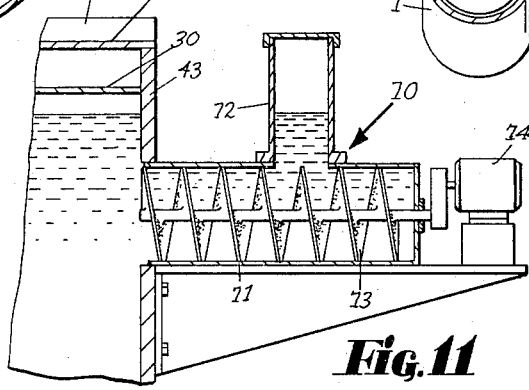
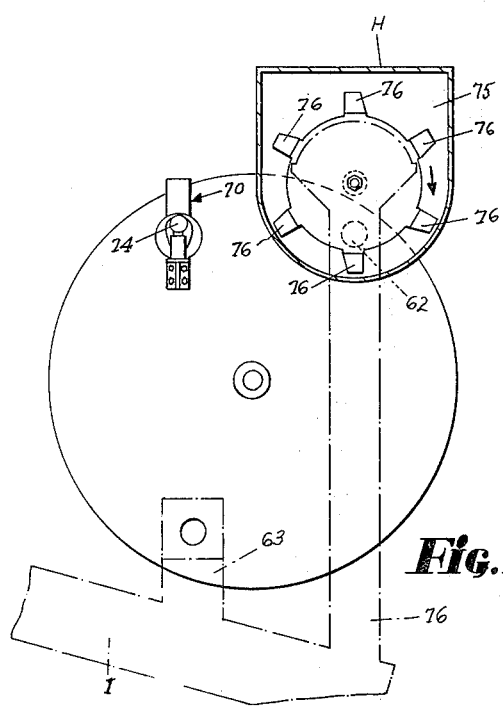
INVENTOR
JACK G. KEITH,
BY Yungblut, Melville, Strasser and Foster
ATTORNEYS United States Patent Office 3,506,407
Patented Apr. 14, 1970

3,506,407
SIMPLIFIED CONTINUOUS RENDERING
SYSTEM
Jack G. Keith, Los Angeles, Calif., assignor to Duke, Inc.,
Germantown, Ohio, a corporation of Ohio
Filed Oct. 12, 1966, Ser. No. 586,292
Int. Cl. C11b 1/12; B01d 43/00, 59/06
U.S. Cl. 23—280                                           16 Claims

ABSTRACT OF THE DISCLOSURE

A dry rendering system wherein the raw materials are cooked in an elongated cooking vessel provided with internal heating means arranged to uniformly and evenly cook the raw materials, the vessel being provided with internal means effective to retard the flow of the raw materials and hence retain them in the cooking vessel for a residence time sufficient to breakdown the protein cells and free the fats which are to be recovered, the system including hogger means in advance of the cooking vessel to reduce the raw materials to a mean particle size for cooking, including conveyor means interconnecting the hogger and the cooking vessel, together with discharge means effective to remove cooked material from the vessel at a variable rate of flow and deliver it to processing means for separating the fats from the cooked material.

---

This invention relates to dry rendering, and deals more particularly with a continuous rendering system wherein animal, fish and poultry by-products, such as fat, bone, and offal, are broken down to yield the fat and pressed tankage. As used herein, the term fat refers to and includes tallow and grease.

In co-pending application Ser. No. 272,098, filed Apr. 10, 1963, and entitled Continuous Rendering System, now Patent 3,288,825, dated Nov. 29, 1966, a completely integrated rendering system is disclosed wherein the raw materials are hogged, equalized or homogenized, blended, cooked, drained, clarified, pressed and filtered, all in a continuous operation. In such process, the raw materials are initially subjected to a two stage hogging operation wherein the raw materials are reduced to chunks and pieces roughly approximating one-half inch cubes. The characterization of the chunks and pieces as cubes is merely for the purpose of giving an approximation of their average size, since the chunks and pieces will not be true cubes. In the equalizer or pre-cooker, which is in the nature of a holding vessel, the particles of raw materials are thoroughly admixed while being heated to a temperature of from 190° F. to 210° F. for a residence period at least equal to one hour flow rate of the raw materials being processed. Such action served to homogenize the raw materials and remove a portion of the moisture therefrom. Upon being removed from the pre-cooker, the partially cooked material is subjected to a blending operation wherein the material is hydraulically ground in its own liquid (fat and moisture), the hot ground material being thereby reduced to a slurry. The slurry so formed is then introduced into one or more finishing cookers operating at a temperature of about 225° F. at the inlet end, with the finished material exiting at about 240° F.–275° F. In the finishing cooker the moisture content of the material is reduced to approximately 7 percent and contains a minimum of 40 percent fluids by weight.

Upon discharge of the material from the finishing cooker, which is then in the form of cracklings and fat, it is drained by being passed through a flow-through type of drainer wherein the free fat is separated from the cracklings, the separated fat flowing by gravity into a clarifier or settling tank (sometimes known as a foots drag) which is a mechanical settling tank acting to remove the bulk of the fines (residual solids) from the fat, whereupon the fat is filtered and stored. Concurrently, the cracklings and fines are pressed to remove residual fat and to compress the solids into cakes of meal which is used for diverse purposes.

While the system just characterized provides a truly continuous rendering operation wherein the over-all quality of the products can be carefully controlled to prevent both overcooking and scorching as well as undercooking, it has now been discovered that the continuous rendering operation can be further simplified and improved with the elimination of a number of the processing steps which were heretofore deemed essential to produce end products of uniformly high quality.

A principal object of the instant invention is the provision of a simplified continuous rendering system which is productive of uniformly high quality fat irrespective of the nature and quality of the raw materials being used, and which requires a lesser amount of equipment and processing operations than heretofore believed possible in a continuous rendering operation.

A further object of the instant invention is the provision of a completely integrated rendering system wherein the raw materials, upon being hogged, are subjected to a single cooking and blending operation which effectively releases the fats from the solids, whereupon the resultant cracklings and fat are fed directly to a pre-presser wherein the bulk of the fat is removed for filtration and storage, the cracklings and fines being advanced to a compacting press wherein the meal cake is formed with the removal of residual fat from the meal.

Still a further object of the invention is the provision of improved apparatus for carrying out the procedures of the instant invention.

The foregoing, together with other objects of the invention which will appear hereinafter or which will be apparent to the skilled worker in the art upon reading this specification, are accomplished by that apparatus and procedures of which an exemplary embodiment will now be given.

Reference is made to the accompanying drawings wherein:

FIGURE 5 is a longitudinal vertical sectional view of a cooker in accordance with the invention.

FIGURE 8 is a partial vertical sectional view taken along the line 8—8 of FIGURE 5.

FIGURE 9 is a partial vertical sectional view taken along the line 9—9 of FIGURE 5.

FIGURE 10 is a vertical sectional view taken along the line 10—10 of FIGURE 5.

FIGURE 11 is a longitudinal vertical sectional view of the sight glass for determining liquid level in the cooker.

FIGURE 12 is a fragmentary vertical sectional view of the discharge control wheel for removing cooked material from the cooker.

FIGURE 13 is an end elevational view of the discharge end of the cooker with parts of the discharge control wheel broken away.

Figure 1:
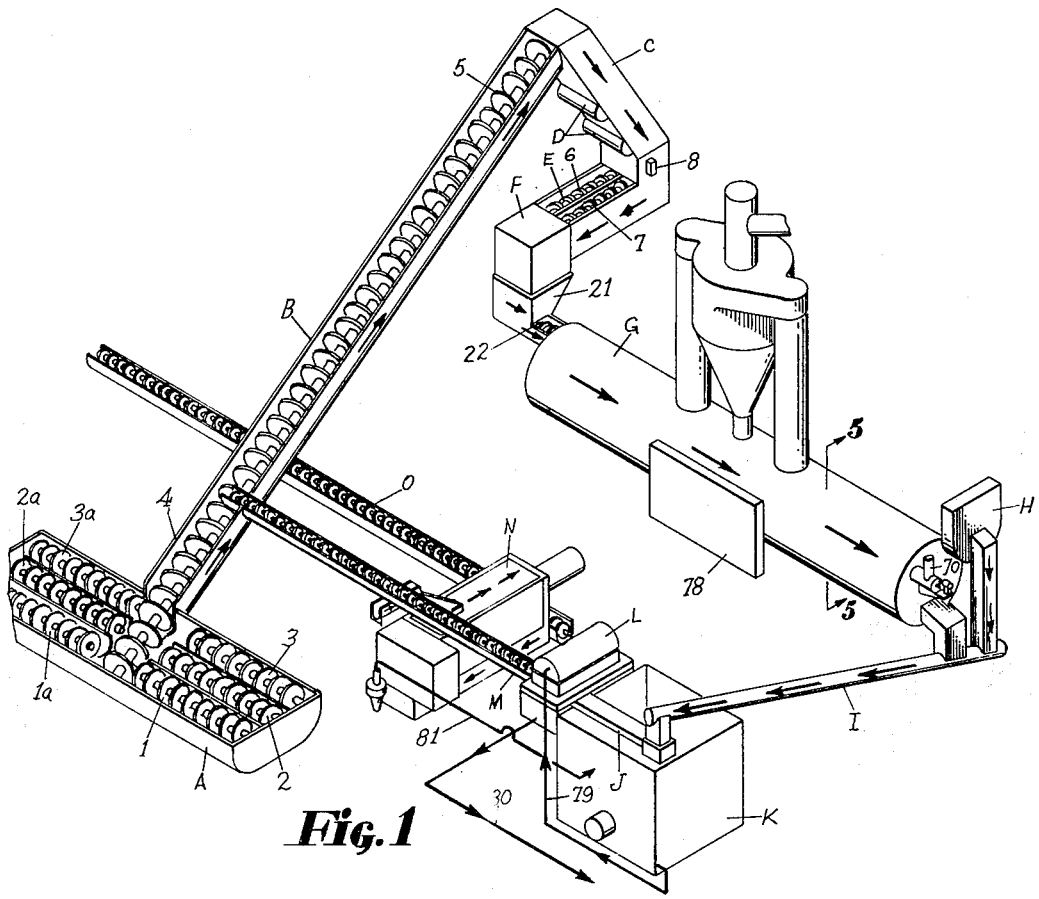
FIGURE 1 is a three dimensional schematic view of a dry rendering system in accordance with the instant invention.

For a general understanding of the invention, reference is first made to FIGURE 1 which comprises a schematic flow diagram. The raw materials are deposited in a raw material bin A which is provided with coacting sets of screw conveyors extending inwardly from opposite ends of the pit toward a centrally disposed screw conveyor B serving to deliver the raw materials to a chute C wherein the materials are subjected to the action of one or more magnets D which remove tramp metal, whereupon the materials are engaged by feed screws E which deliver the materials to the hogger F. The hogger acts to reduce the raw materials to the desired mean particle size, whereupon the comminuted material is fed into the cooker G, which constitutes the heart of the system. It is in the cooker which is of a specific construction to be hereinafter described, that the raw materials are admixed and blended, while at the same time being held and cooked to the extent of reducing the moisture content to the desired level while releasing the bulk of the fats. The cooked material is continuously removed from the cooker G by means of discharge control wheel H the speed of operation of which varies in accordance with the conditions existing at the discharged end of the cooker, particularly the temperature of the cooked materials. The discharged materials are conveyed by the wet crax screw I to a prepresser or screen J where the free fat is discharged into the crude tallow tank K. The recovered fat is then piped to the centrifuge L which separates the fat for subsequent discharge from the system. The solids from the prepresser, which comprises the cracklings, together with the fines removed by the centrifuge, are advanced by screw conveyor M to the press N wherein the solids are compacted into a continuous cake which is discharged through pressed cake screen O, the residual fats recovered during the pressing operation being returned to the crude tallow tank K. Alternatively, the screw conveyor M may be utilized to return cracklings to the raw material conveyor B for recirculation in the event such expedient is dictated by operating conditions.

With the foregoing brief description in mind, a more detailed description of the operation of the system will now be given.

INTRODUCING THE RAW MATERIALS

The raw material bin A is intended to receive the materials directly from the trucks or the like in which they have been collected. No particular effort need be made to segregate or classify the raw materials as they are deposited in the pit. The coacting sets of screw conveyors 1, 2, 3 and 1a, 2a, 3a, which extend inwardly from the opposite ends of the pit toward the centrally disposed screw conveyor B, coact to move the raw materials centrally toward the conveyor B for transfer to the hogger. With such arrangement, some blending of the raw materials will occur as they are brought together at the center of the pit. To the extent that whole carcasses, rib cages and the like are deposited in the pit, the sets of screws will deliver them in sufficiently small pieces so that they may be readily handled by the conveyor B.

The conveyor B is preferably of the so-called wraparound type in which the side walls 4 of the conveyor trough are sufficiently deep to project above the screw 5 so as to retain the raw materials while at the same time assuring their free movement along the conveyor without jamming. Upon reaching the top of the conveyor B, the raw materials will fall by gravity through chute C wherein they will be subjected to the action of the magnets D which remove tramp metal from the materials as they move downwardly to the hogger feed screws E.

It is preferred to employ tandem hogger feed screws 6 and 7 so that the raw materials are delivered to the hogger F uniformly and in sufficient quantity to meet its maximum capacity. Since the input of raw materials to the cooker G will be governed by the operating conditions existing in the cooker, the hogger feed screws 6 and 7 preferably will be driven at a selected speed and adapted to be stopped and started by the controls of the system in accordance with the demands of the cooker. In addition, limit switch means, diagrammatically indicated at 8, may be provided in the chute C to stop the movement of the screw conveyor B and the sets of screws in pit A in the event of an over-load which may result when the feed screws 6 and 7 are stopped.

THE HOGGER

The hogger F is of special design, being constructed so that it will, in a single operation, reduce the mean particle size of the raw materials to an essentially uniform size which is sufficiently small to permit the particles to be fed directly to the cooker. For this purpose, it is desirable that the raw materials be reduced in a single operation to a mass of chunks and pieces roughly approximately one-half inch cubes. It will be understood that such characterization is merely for the purpose of giving an approximation of the average size of the pieces since, upon discharge from the hogger, the raw materials will be more or less in the nature of a slurry-like mass.

Figure 2:
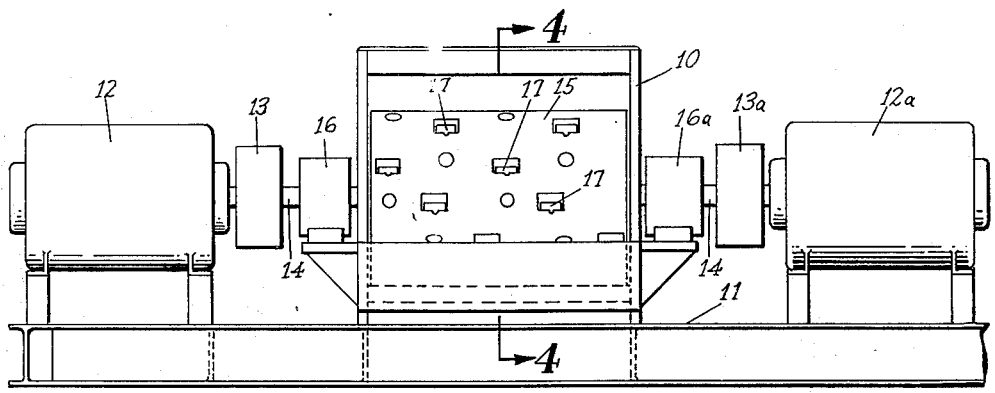
FIGURE 2 is a side elevational view of a hogger in accordance with the invention.
Figure 3:
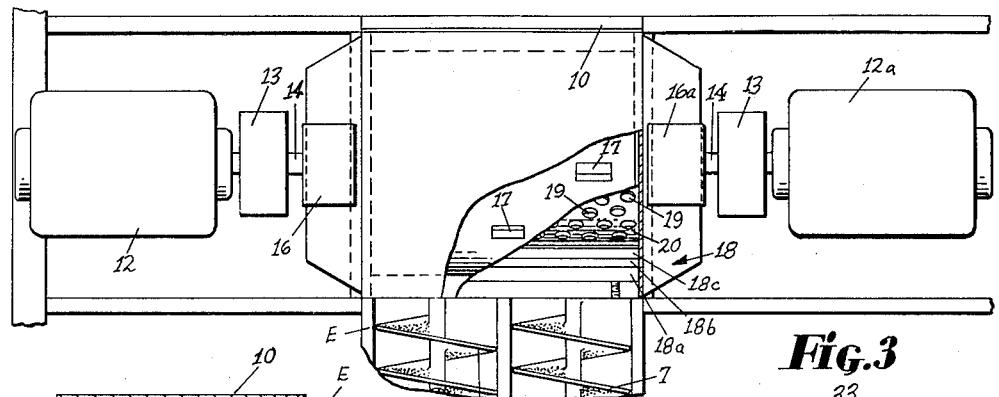
FIGURE 3 is a plan view of the hogger with parts broken away.
Figure 4:
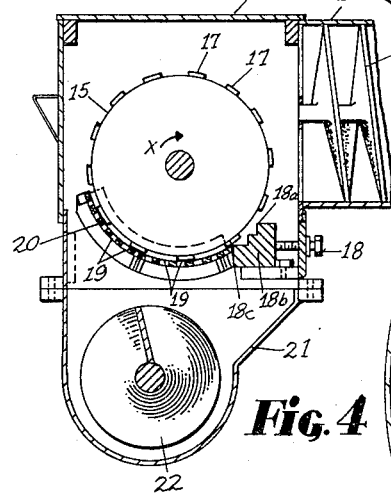
FIGURE 4 is a vertical sectional view of the hogger taken along the line 4—4 of FIGURE 2.
Figure 7:
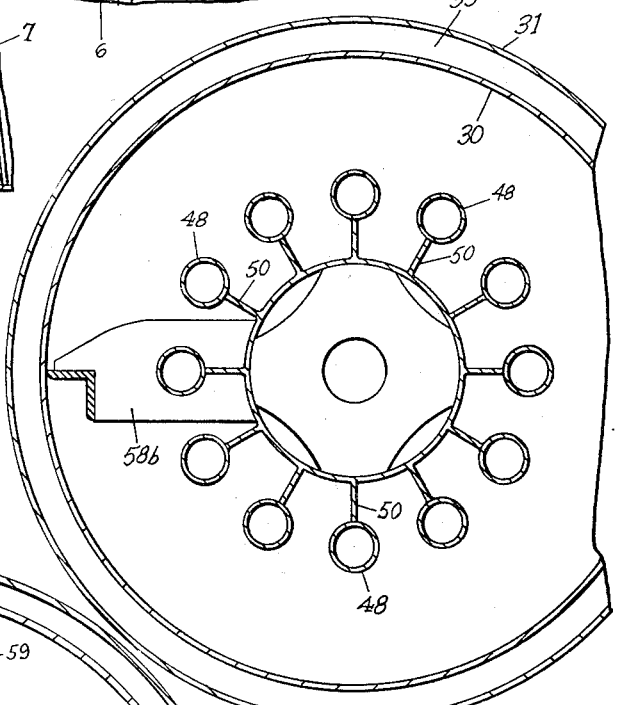
FIGURE 7 is a partial vertical sectional view taken along the line 7—7 of FIGURE 5.

In order to grind the raw materials to the desired particle size in a single operation, a hogger of the character illustrated in FIGURES 2, 3, and 4 is employed, which may be characterized as a triple anvil hogger. Such hogger comprises a housing 10 mounted on a suitable support 11 which also mounts the prime movers 12 and 12a which act through couplings 13 and 13a to drive the shaft 14 of rotor 15 which is journaled within the housing 10 by means of bearing assemblies 16 and 16a. While dual prime movers have been illustrated, it will be understood that a single high torque source of power may be employed.

The rotor 15 will be provided with a series of spaced apart hogger knives 17 mounted about its periphery in the manner illustrated, the knives being set in knife pockets formed in the rotor in a manner which will be understood by the skilled worker in the art.

Upon rotation of the rotor in the direction of the arrow X seen in FIGURE 4, the hogger knives 17 will be brought into shearing relationship with the anvil 18 which, in accordance with the invention, is a triple anvil having shearing edges 18a, 18b and 18c positioned to be successively contacted by the advancing knives. Preferably, the triple anvil 18 will be machined from a solid metal block, although if desired the anvil may be constructed of separate parts or provided with replaceable shearing edges.

The raw materials forced into the hogger by the feed screws 6 and 7 will be reduced to the desired particle size by the shearing action of the knives 17 as they pass over the successive shearing edges or steps of the anvil.

The raw materials, upon being ground to the desired size by the action of the knives against the anvil, are then forced through perforations 19 in a screen 20 underlying the rotor 15. The screen is of curved configuration and positioned to overlie the discharge chute 21 which overlies a feed screw 22 (see FIGURES 1 and 4) which delivers the comminuted material to the cooker G. The action of the knives 17 as they pass over the perforations 19 in the screen further serves to assure the desired reduction in size of the raw materials, with the result that the raw materials are delivered to the cooker uniformly sized for the cooking operation.

The feed screw 6 and 7 will be capable of being driven at a variable rate so that the rate of flow of the raw materials into a cooker may be varied to maintain the desired operating conditions in the cooker. Preferably the cooker feed screw 22 will operate continuously with the volume input of raw materials to the cooker varied by intermittently operating screws 6 and 7. If desired the feed screw 22 may be operated at a variable rate.

THE COOKER

The cooker G is the heart of the system, comprising an elongated vessel of large capacity provided with internal heating means arranged so as to essentially uniformly and evenly cook the raw materials placed therein. At the same time, the vessel is divided into a plurality of chambers or compartments which retard the flow of the raw materials from the leading to the trailing end of the cooker, thereby assuring that all of the materials being processed are retained in the cooker for a residence time sufficient to break down the protein cells and free the fats which are to be recovered.

Referring now to FIGURES 5 through 10 of the drawings, the cooker comprises an elongated vessel 30 surrounded by a jacket 31 divided centrally by a barrier wall 32 defining a leading steam compartment 33 and a trailing steam compartment 34. Thus, the vessel 30 may be heated externally by steam introduced into the steam compartments 33 and 34 through inlets 35 and 36, respectively, the steam being discharged from the compartments through the outlets 37 and 38. A hollow steam shaft 39 is rotatably mounted within the vessel 30, the steam shaft having mounting shafts 40 and 41 at its opposite ends journaled in the end walls 42 and 43 of the cooker by means of outboard bearing assemblies indicated generally at 44. The steam shaft is adapted to be rotated by means of a prime mover 45 operatively connected to the shaft 40 through suitable gearing 46.

Steam is introduced into the steam shaft through an inner conduit 47 in the mounting shaft 41, the steam entering the steam shaft 39 wherein it travels lengthwise of the shaft and is distributed to a plurality of tubes 48 radially disposed about the steam shaft in spaced relation thereto, the steam passing into the steam tubes through connections 49, several of which are seen in FIGURE 5. The steam tubes 48 extend lengthwise throughout the full effective length of the vessel, being mounted on fins 50 radiating outwardly from the steam shaft 39. The steam travels through the tubes 48 from the leading to the trailing end of the vessel, being discharged through connections 51 into a chamber 52 formed in the steam shaft 39. From chamber 52 the steam passes through ports 53 into an adjoining chamber 54 from whence it is discharged through orifices 55 into outer conduit 56 which surrounds inner conduit 47 centrally disposed within the mounting shaft 41. It will be understood, of course, that the conduits 47 and 56, which rotate with the steam shaft 39, will be connected to supply and exhaust lines, respectively, through fittings which will permit the conduits to rotate relative to the lines to which they are connected.

In order to remove condensate from the system—which ultimately collects in the chamber 54—a spiral baffle 57, best seen in FIGURE 10, is provided in chamber 54, the baffle having its innermost end fixedly secured to the mounting shaft 41 to one side of the orifices 55. The baffle spirals outwardly within the chamber 54 with its outermost end juxtaposed to the inner wall surface of steam shaft 39. The baffle 57, which rotates with the shaft, thus serves as a condensate lift effective to deliver condensate to the orifices 55 for discharge through outer conduit 56 along with residual steam.

With the heating arrangement just described, raw materials within the vessel are at all times in close proximity to a heating surface, and by reason of the multiplicity of heating surfaces afforded by the steam shaft 39, the steam tubes 48, together with the steam jacketing surrounding the vessel, the raw materials can be rapidly and uniformly heated to the required cooking temperature. In addition, the heating of the material may be controlled by selectively varying the heat applied through the leading and trailing steam compartments 33 and 34 and steam shaft 39.

In order to insure thorough admixing and homogenizing of the raw materials in the cooker, a series of mixing blades 58 are mounted on the steam shaft for rotation therewith. The outermost edges of the blades lie in close proximity to the wall surfaces of the cooking vessel and effectively cover the full length of the vessel, although the blades are in staggered relation with successive blades lying at right angles to each other, as will be evident from a comparison of FIGURES 6 through 9 wherein successive blades are shown at 58a through 58e. With such arrangement, the raw materials are prevented from remaining in stationary contact with the heated wall surfaces of the vessel, thereby preventing scorching of the raw materials which is detrimental to the color and quality of the fat.

Figure 6:
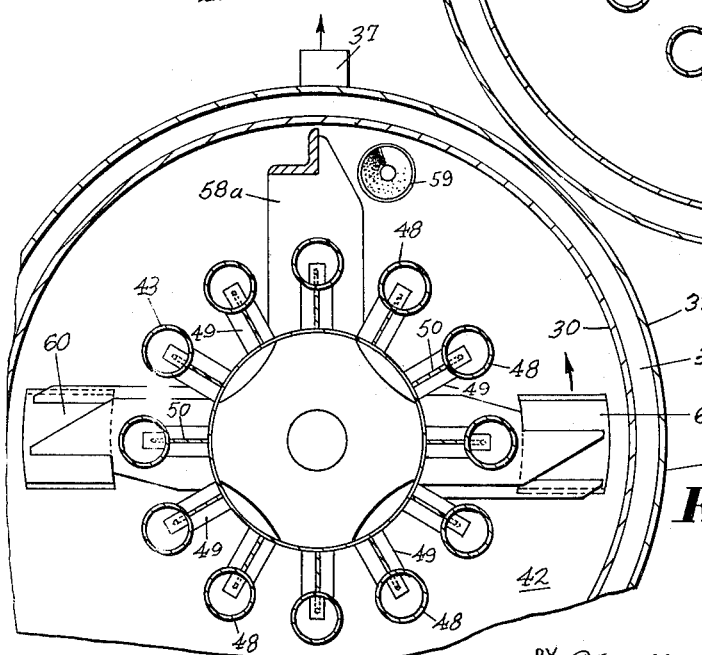
FIGURE 6 is a partial vertical sectional view taken along the line 6—6 of FIGURE 5.

The raw materials are introduced into the vessel through inlet opening 59 in end wall 42, the incoming materials being contacted by the curved wiper paddles 60, seen in FIGURE 6, which are positioned to pass in close proximity to the inlet opening 59 and sweep the incoming materials into the vessel. Similar wiper paddles 61 are provided at the opposite end of the vessel to cause the cooked material to be discharged through outlet opening 62 or through clean out opening 63. Outlet opening 62 will lie above the normal level of liquid in the cooker and hence the paddles 61 will lift the material to the outlet orifice.

In order to prevent the raw materials from flowing directly from the leading to the trailing end of the cooker without being adequately cooked, the interior of the vessel is divided into a series of chambers by means of baffles 64, 64a. As seen in FIGURE 8, the baffle 64 is mounted on the steam shaft 39 for rotation therewith, and is of a size to effectively partition the vessel excepting for the cutout 65 which permits limited flow of the raw materials from one chamber to the next. It will be understood that the baffle 64a will be of similar construction. Normally its cutout will be in alignment with the cutout 65 in baffle 64, although the cutouts may be angularly related if so desired. Such arrangements effectively retard direct flow of the raw materials from one end of the cooker to the other and hence insure adequate residence time for complete cooking.

In order to provide the operator of the system with an accurate indication of the liquid level within the cooker, a sight glass unit 70, as seen in FIGURE 11, is provided at the discharge end of the cooker. The sight glass unit comprises a horizontally disposed tube 71 which communicates with the vertically disposed transparent sight tube 72. Liquid flowing into the tube 71 will rise in vertical tube 72 until it reaches the level of the material in the vessel, thereby giving the operator a clear indication of the liquid level in the cooker. It is necessary, however, to prevent the tubes 71 and 72 from being clogged with solids or semi-solids in the materials being cooked. A screw 73 is mounted in tube 71 and driven by a motor 74 or by connection to the shaft 41 so as to cause any non-liquid matter to be returned to the cooker. The screw will, however, permit liquid to flow through tube 71 and into sight tube 72. The device is thus self-cleaning and an accurate indication of liquid level in the cooker is obtained.

DISCHARGE CONTROL WHEEL

As the cooked raw material is discharged through outlet opening 62 by action of the wiper paddles 61, the material enters a metering chamber 75 seen in FIGURES 12 and 13, in which a plurality of buckets 76 are mounted for rotation, the buckets acting to successively dip into the supply of cooked material in the chamber 75 and deposit it in the chute 77 for delivery to the feed screw I. The buckets will be rotated by suitable drive means, indicated generally at 78, their speed of rotation being variable so as to meter the output of cooked material to the screw I which delivers the cooked material to the pre-presser J. The number of buckets employed may be varied depending upon the size of the cooker and the volume of material being handled.

The speed of rotation of the buckets 76 will be determined by the temperature of the cooked material at the discharge end of the cooker. To this end, the control panel 78 (FIGURE 1) will be provided with suitable temperature sensing devices and related control mechanism for varying the operating speed of the discharge buckets. While not normally required, temperature sensing means also may be provided at the inlet end of the cooker to additionally control the cooking temperatures within the cooker.

PROCESSING THE COOKED MATERIAL

The cooked material is conveyed by the screw I to the pre-presser J which extracts a substantial portion of the freed fats from the cooked material. The pre-presser is of the flow through type having a screw of diminishing pitch surrounded by a cage—usually in the form of closely spaced longitudinally extending bars—so that as the cooked material is compacted by the diminishing pitch of the screw and a retarding choke at the discharge end of the screw. The fats will be caused to flow outwardly through the cage and collected in the crude tallow tank K. Preferably, the pre-presser will be inclined upwardly from its leading to its trailing end at an angle of about 15° from the horizontal to prevent flushing of the fats through the pre-presser.

The residue discharged by the pre-presser is advanced by the screw conveyor M for final pressing in the press N. Coincidently, the screw conveyor M may be utilized to return portions of the pre-pressed material to the feed conveyor B in the event recirculation of the pre-pressed material is required. The press N is of known construction embodying a hydraulic sleeve type choke having automatic compensating characteristics to accommodate variations in the composition of the cooked material being pressed.

The fat or tallow collected in the tank K, wherein the fat is preferably maintained in a state of agitation, is fed through conduit 79 to centrifuge L where it is separated and discharged into the conduit 80 for deliverage to a storage tank (not shown). Similarly, fat extracted by the press N is pumped through conduit 81 to the crude tallow tank K. Fines from the centrifuge L will be returned to conveyer screw M for compacting into meal in the press N. The meal or cake discharged from the press N will be advanced by pressed cake screw O for further processing or storage.

OPERATING THE SYSTEM

The key to successful operation of the system lies in the controlled cooking of the raw materials to insure that the bulk of the moisture is removed while the materials are in the cooker G. It has been found that the temperature at the leading end of the cooker should be maintained within the range of 200° F–240° F., whereas the tempertaure of the cooked materials discharged from the cooker should be in the range of 240° F–280° F., with a 40° F. mean temperature gradient between the entrance and discharge ends of the cooker. The size of the cooker should be such as to provide for a residence time at least equal to one hour flow rate.

In order to achieve complete cooking of the raw materials and the freeing of the fats therefrom, it is necessary to remove a substantial portion of the moisture from the materials in the cooker. Preferably, the cooked material should have a moisture content of from 7 to 10 percent as it is discharged from the cooker, although depending upon the nature of the materials being processed, the moisture content may be higher, ranging up to a maximum of about 20 percent moisture content.

The cooking temperature may be modulated to maintain it within the desired range by an interplay of the controls available to the operator. If, for example, the temperature within the cooker rises beyond the prescribed cooking range, the operator may reduce or shut off the supply of steam to either or both of the steam compartments 33 and 34, depending upon the area which is overheating. Similarly, the flow of steam through the steam shaft and tubes may be varied. A cooling effect also may be achieved at the inlet end of the cooker by increasing the input of raw materials, whereas a cooling effect may be achieved at the discharge end by speeding up the rate of withdrawal of cooked material by means of the discharge control wheel, thereby allowing a greater mass of the somewhat cooler materials from the intermediate section of the cooker to flow toward the discharge end.

If the cooking temperatures are too low, it will be evident that the rates of material input and discharge may be reduced, thereby retarding the rate of flow so that the material in the cooker will have a longer residence time and hence will be heated. At the same time, the rate of flow of steam through the jacket chambers may be increased, as may the rate of flow through the steam shaft and its heating tubes.

The operator is thus provided with a variety of controls by means of which the cooking may be carried to completion in a single cooking operation. This departs markedly from continuous dry rendering systems heretofore envisioned, all of which required a multiplicity of heating and cooking steps to achieve the necessary breakdown of the protein cells to yield fat. The present system provides a minimum of operating components and yet provides the operator with wide flexibility for controlling operating conditions to assure uniform high quality of the extracted fats.

It will be evident to the skilled worker in the art that modifications may be made in the invention without departing from its spirit and purpose.

The embodiments of the invention in which an exclusive property or privilege is claimed are defined as follows:

1. A continuous system for the dry rendering of raw materials in the form of animal, poultry and fish by-products to produce fat and tankage wherein the raw materials are cooked to free the fats therefrom in a single cooking operation, said system consisting essentially of:

(a) hogger means for reducing the raw materials to a mean particle size for cooking;

(b) an elongated cylindrical cooking vessel having a leading end and a discharge end, an inlet opening in said leading end and an outlet opening in said discharge end, a steam jacket surrounding the cylindrical wall surfaces of said vessel, a steam shaft rotatively mounted within said vessel and extending axially thereof, means for rotating said steam shaft, steam tube means surrounding said steam shaft in spaced relation thereto, said steam tube means being mounted for rotation with said steam shaft, means for introducing steam into said steam shaft and said steam tube means, means for discharging the steam and condensate therefrom, agitating means mounted for rotation relative to the cylindrical wall surface of said vessel, and rotatable means mounted within said vessel to control the flow of raw materials from the leading end to the trailing end of the vessel;

(c) conveyor means interconnecting said hogger means and the inlet opening in said cooking vessel for continuously delivering raw materials directly from said hogger means to said cooking vessel;

(d) discharge means operatively connected to the outlet opening in said vessel for removing cooked materials therefrom, said discharge means including metering means operative to continuously discharge cooked materials from said vessel during operation at a variable rate of flow; and (e) pressing means operatively connected to said discharge means for receiving the discharged cooked materials and separating the fats therefrom.

2. The combination claimed in claim 1 wherein said discharge means comprises a metering chamber in communication with the outlet opening in said cooking vessel, and wherein said metering means comprises a plurality of buckets rotatively mounted within said chamber, and chute means positioned to receive cooked material from the buckets as they rotate within said chamber, said chute means being operatively connected to said pressing means.

3. The combination claimed in claim 2 wherein said hogger comprises a housing in which a rotor is rotatively mounted, said rotor mounting a plurality of hogger knives spaced about its periphery, and an anvil positioned to be contacted by said hogger knives, said anvil having a series of three shearing edges arranged in step-wise relation to each other and positioned to be successively contacted by said knives.

4. The combination claimed in claim 3 wherein said hogger includes a curved screen lying in close proximity to the path of travel of said knives, said screen being positioned to receive the ground materials as they pass beyond the anvil.

5. The combination claimed in claim 4 including sight glass means at the discharge end of said vessel, said sight glass means comprising a horizontally disposed tube projecting outwardly from the discharge end of said vessel and in communication with the interior thereof, a vertically disposed transparent sight tube projecting upwardly from said horizontal tube, and screw means rotatively mounted in said horizontal tube, and means for rotating said screw means in a direction to cause non-liquid matter entering the horizontal tube from the cooking vessel to be returned to said vessel.

6. A cooker for use in dry rendering which comprises:
(a) an elongated cylindrical vessel having a leading end and a discharge end, an inlet opening in said leading end and an outlet opening at the discharge end,
(b) a steam jacket surrounding the cylindrical wall surface of said vessel,
(c) a steam shaft rotatably mounted within said vessel and extending lengthwise thereof,
(d) means for rotating said steam shaft,
(e) steam tube means surrounding said steam shaft in spaced relation thereto, said steam tube means being mounted for rotation with said steam shaft,
(f) means for introducing steam into said steam shaft and said steam tube means, and means for discharging condensate therefrom,
(g) agitating means mounted for rotation relative to the cylindrical wall surfaces of said vessel, and
(h) baffles within said vessel internally partitioning it into a plurality of side-by-side chambers, said baffles having cutout portions effective to permit restricted flow of materials from one chamber to the next.

7. The cooker claimed in claim 6 wherein said baffles are of generally circular configuration and are mounted on said steam shaft for rotation therewith.

8. The cooker claimed in claim 7 wherein said steam tube means comprises a plurality of elongated tubes concentrically disposed about said steam shaft and extending lengthwise thereof, said steam tubes extending through said baffles.

9. The cooker claimed in claim 8 wherein said agitating means comprises a staggered series of blades extending in the direction of the length of said vessel and mounted on arms projecting radially outwardly from said steam shaft.

10. The cooker claimed in claim 9 wherein paddles are mounted on the opposite ends of said steam shaft and positioned to pass in close proximity to the inlet and outlet openings in the opposite ends of said vessel, whereby to exert a wiping action with respect to said openings.

11. The cooker claimed in claim 10 wherein the means for discharging condensate therefrom comprises a chamber at one end of said steam shaft into which condensate is collected from said steam tubes, a centrally disposed outlet conduit having orifices therein in communication with said chamber, and a spiral baffle within said chamber, said baffle having its innermost end fixedly secured to said outlet conduit on one side of said orifice, the baffle spiraling outwardly within said chamber with its outermost end juxtaposed to the inner wall surface of said chamber.

12. A cooker for use in dry rendering which comprises:
(a) an elongated cylindrical vessel having a leading end and a discharge end, an inlet opening in said leading end and an outlet opening at said discharge end,
(b) heating means surrounding the cylindrical wall surface of said vessel,
(c) internal heating means rotatably mounted within said vessel and extending lengthwise thereof,
(d) agitating means mounted for rotation relative to the cylindrical wall surfaces of said vessel,
(e) means for rotating said internal heating means and said agitating means, and
(f) rotatable means mounted within said vessel to restrict the flow of material from the leading end to the trailing end of the vessel.

13. The cooker claimed in claim 12 wherein the rotatable flow restricting means mounted within said vessel comprises baffle means lying at spaced apart intervals lengthwise of said vessel and mounted on said internal heating means for movement therewith, said baffle means acting to internally partition said vessel into a plurality of side-by-side chambers with restricted flow openings between adjoining chambers.

14. The cooker claimed in claimed 12 wherein said internal heating means includes a hollow steam shaft rotatably mounted within said vessel and extending lengthwise thereof, means for introducing steam into said steam shaft, and means for discharging steam and condensate therefrom, said discharge means including an annular chamber at one end of said shaft, a centrally disposed outlet conduit in communication with said chamber, and a spiral baffle within said chamber, said baffle having its innermost end in communication with said outlet conduit and spiraling outwardly within said chamber with its outermost end juxtaposed to the annular wall surface thereof.

15. The cooker claimed in claim 14 wherein said internal heating means also includes a plurality of steam tubes lying in spaced relation to said steam shaft and rotatable therewith, means connecting said steam shaft to one end of said steam tubes, and means connecting the opposite ends of said steam tubes to said annular chamber.

16. The cooker claimed in claim 15 wherein the means connecting the opposite ends of said steam tubes to said annular chamber includes a second annular chamber adjacent said first chamber, said chambers being interconnected by ports.

References Cited

UNITED STATES PATENTS

| | | | |
|---|---|---|---|
| 72,254 | 12/1867 | Winants | 23—280 X |
| 533,896 | 2/1895 | Holthaus | 26—412.6 |
| 829,955 | 9/1906 | Edson | 23—280 |
| 1,717,465 | 6/1929 | O'Meara | 23—280 X |
| 2,035,090 | 3/1936 | Molin | 23—280 |
| 2,551,034 | 5/1951 | Merriman et al. | 23—280 |
| 3,295,929 | 1/1967 | Allbright et al. | 260—412.6 |
| 3,288,825 | 11/1966 | Keith | 23—280 X |

MORRIS O. WOLK, Primary Examiner

D. G. CONLIN, Assistant Examiner

U.S. Cl. X.R.

210—180; 260—412.6